Feb. 28, 1939.   H. C. RONES   2,149,148
OPTICAL INSTRUMENT FOR ORTHOPTIC PURPOSES
Filed Aug. 18, 1936   3 Sheets-Sheet 1
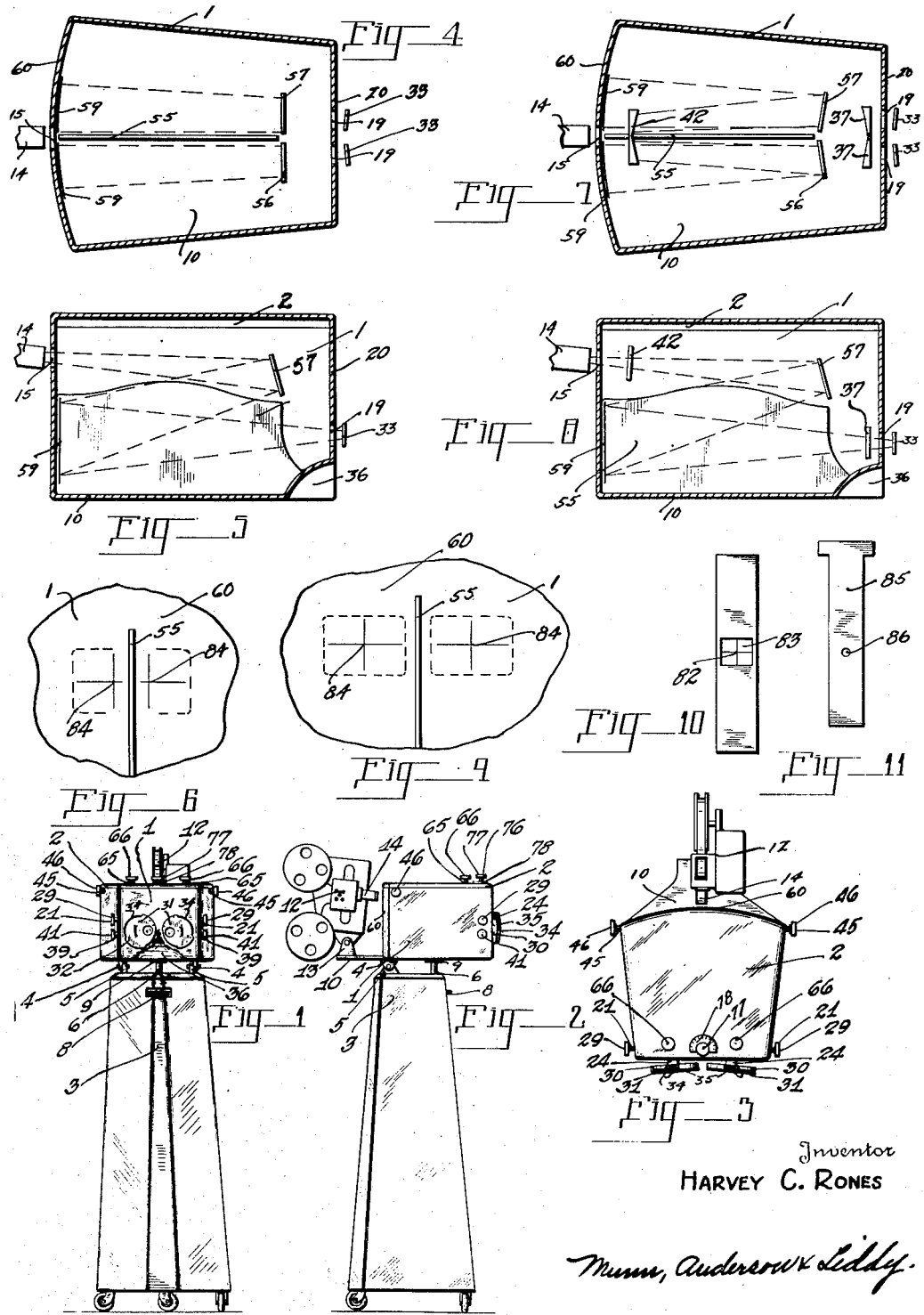
Inventor
HARVEY C. RONES

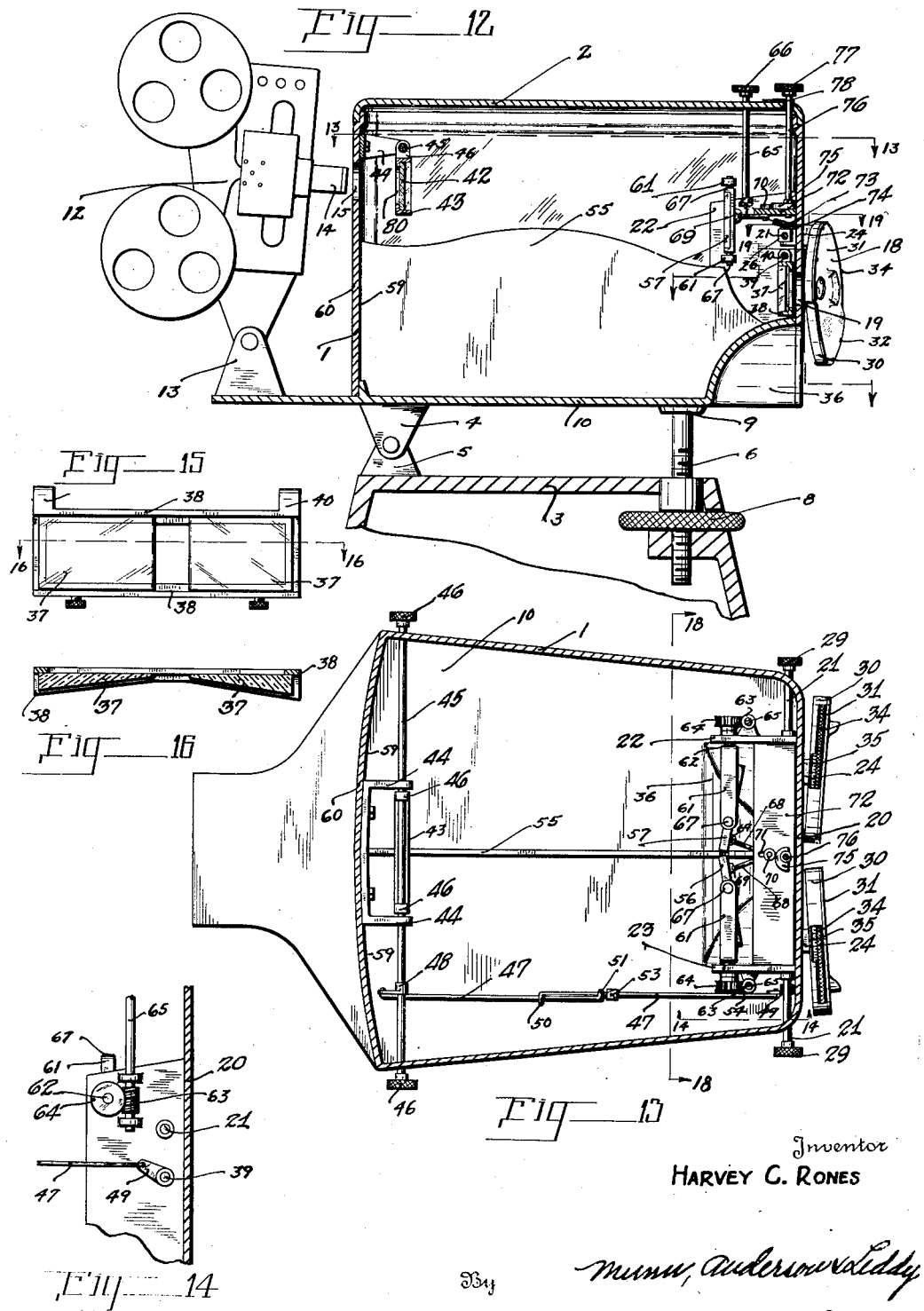

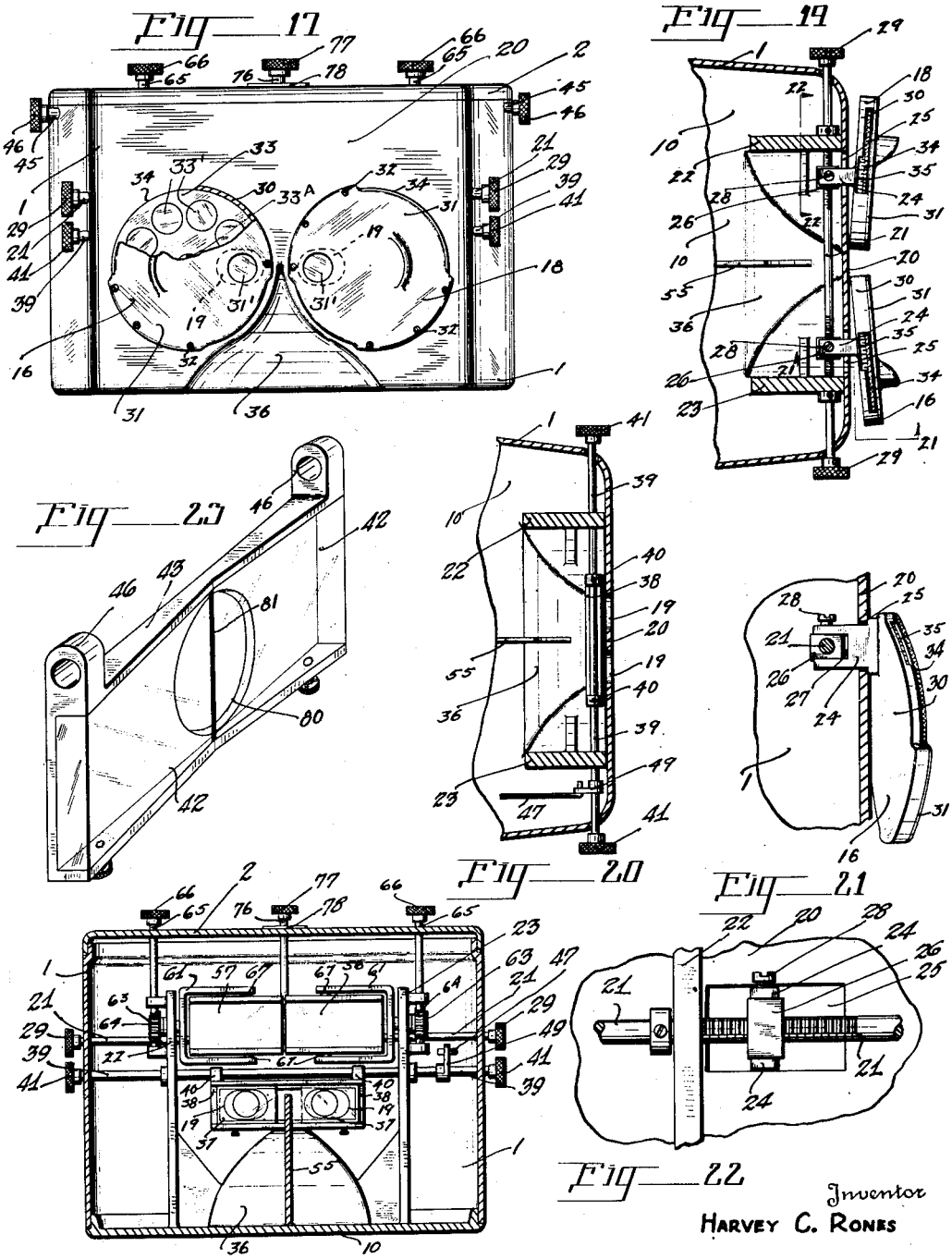

Patented Feb. 28, 1939

2,149,148

UNITED STATES PATENT OFFICE 2,149,148

OPTICAL INSTRUMENT FOR ORTHOPTIC PURPOSES

Harvey C. Rones, Astoria, Oreg.

Application August 18, 1936, Serial No. 96,564

2 Claims. (Cl. 128—76.5)

My invention relates to optical instruments and has particular relation to optical instruments to be used for orthoptic purposes and for the eyes. In the treatment of the visual senses, retinal stimulation is of great importance and such stimulation should include light, forms or shapes, color, motion and a combination of all.

The primary object of this invention is to provide in an improved manner light, forms, color and motion in a controlled and regulated manner so that the eyes may be stimulated and exercised and also tested.

Another object of my invention is to provide an improved instrument including a moving picture projector that is self contained having controls for reflecting, displacing and otherwise controlling the projected light and images from the projector.

A further object of my invention is to produce moving pictures at various distances apart effecting ductions of the eye muscles.

Another object of my invention is to divide a projected motion picture equally on either side of a dividing wall, said wall located midway between the line of vision of either eye. When these divided pictures are properly spaced from the dividing wall they will appear as a completed picture when viewed by a patient of normal eye sight, providing a treatment for eyes with abnormal sight.

A still further object of my invention is to provide a means for projecting a complete picture on either side of a dividing wall, either by adjustable prisms or by projecting a film having pictures arranged in pairs.

Another object of my invention is the analyzing of muscular embalance, suppressions and other eye defects, and the correction of the same by prismatic and motion picture effects.

This invention is illustrated in the accompanying drawings in which—

Fig. 1 is a front elevation of the invention;

Fig. 2 is a side elevation of the invention showing the relationship of the motion picture projector;

Fig. 3 is a plan view of the previous figures;

Fig. 4 is a diagrammatical sectional view showing the path of the light rays in projecting the picture equally on both sides of the dividing wall;

Fig. 5 is a side diagrammatical sectional view of Figure 4;

Fig. 6 is a fragmentary view of the picture as projected in Figs. 4 and 5;

Fig. 7 is a diagrammatical sectional view showing the path of the light rays when the prisms are revolved into position for projecting a separate picture on each side of the dividing wall;

Fig. 8 is a side diagrammatical sectional view of Figure 7;

Fig. 9 is a fragmentary view of the picture projected in Figs. 7 and 8;

Fig. 10 illustrates cross hairs placed in the film gate aperture for purpose of alignment;

Fig. 11 illustrates a plate placed in front of the film gate when reducing the picture;

Fig. 12 is a fragmentary sectional view illustrating the lens mechanism, reflectors and prisms;

Fig. 13 is a sectional view taken on the line 13—13 of Fig. 12, looking in the direction indicated;

Fig. 14 is a fragmentary sectional view taken on line 14—14 of Fig. 13, looking in the direction indicated, illustrating the reflector revolving mechanism;

Fig. 15 is a front elevation of the prisms used between the lens and the screen;

Fig. 16 is a sectional view taken on line 16—16 of Fig. 15 looking in the direction indicated;

Fig. 17 is a front elevation of the invention illustrating the lens mechanism;

Fig. 18 is a rear sectional view taken on line 18—18 of Fig. 13 looking in the direction indicated;

Fig. 19 is a fragmentary sectional view taken on line 19—19 of Fig. 12 looking in the direction indicated, illustrating the lens positioning mechanism;

Fig. 20 is a fragmentary sectional view taken on line 20—20 of Fig. 12 looking in the direction indicated, illustrating the front prism revolving mechanism;

Fig. 21 is a fragmentary sectional view taken on line 21—21 of Figure 19 looking in the direction indicated;

Fig. 22 is a fragmentary sectional view taken on line 22—22 of Fig. 19 looking in the direction indicated; and Fig. 23 is a perspective view of the prisms interposed between the projector and reflectors.

Referring to the drawings a main body or housing 1 is indicated by numeral 1, having a removable lid 2, the housing being mounted upon a base 3 by suitable hinging supports 4, pivotally mounted to the upright legs 5. So that the angle of the housing may be adjusted to any desired angle relative to the patient, I provide an adjustable jack screw 6 threaded within the hand wheel 8 so that it may be moved up and down by the revolving of the hand wheel, the upper end of the screw 6 contacting the under side of the housing at 9. The base 10 extends outwardly from the housing 1 and has a motion picture projector 12 hingedly mounted thereon at 13 in such a manner that the lens 14 of the projector projects a picture through the opening 15 in the housing 1.

A pair of selective lens mechanisms indicated at 16 and 18 are aligned with openings 19 within the end 20 of the housing 1, the lens units 16 and 18 being adjustable towards and away from each other by means of a control rod 21 journaled within the upright brackets 22 and 23 extending upwardly from the base 10. Extending rearwardly from the lens units 16 and 18 and supporting the lenses are lugs 24 which pass through elongated openings 25 of the wall 20, permitting lateral movement of the lugs, and nuts 26 threaded to the shaft 21 are locked within the U-shaped recess 27 of the lugs by the set screw 28. A reverse thread is turned upon the shaft 21 so that the lens units will move in opposite directions towards and away from each other when the knurled control handles 29 are revolved.

Each of the lens housings 16 and 18 consists of a main body portion 30, having an opaque face plate 31 retained thereon by the screws 32, the face plate being provided with eye openings 31' through which the patient looks through the lens and opening 19 and into the housing as shown most clearly in Fig. 17. Behind the face plate 31 a lens disc 33 is pivotally mounted on a shaft 33ᵃ. So that lenses of various grades or qualities may be selected, I provide the lens disc with a plurality of lenses of different qualities indicated at 33' at spaced intervals around the lens disc so that they may be brought into registry with the opening 19 and the opening 31' in plate 31 when the disc 33 is rotated to the proper position. To facilitate rotating the disc a portion of the periphery thereof is exposed and the periphery is preferably knurled as indicated at 34. Indicia as shown at 35 are preferably provided to indicate the particular quality lens in registry with the opening 19. The lens housings 16 and 18 are preferably of the same construction as shown in the drawings and described above. The lens housing as described above is the preferred form; however, other suitable lens housings having adjustments for the spacing of the eyes and having means for selecting different type lenses may be employed.

Beneath the lenses a hollowed out portion 36 provides clearance for the nose of the patient while viewing through the lens. A set of prisms 37 disposed in frame 38 are mounted within the housing directly in front of the lens openings 19, the frame being fixedly mounted to the shaft 39 by suitable arms 40. The shaft 39 is journaled through the upright supports 22 and 23 having control knobs 41 for raising or lowering the prisms out of or into the line of vision.

Another set of prisms 42 are mounted adjacent the openings 15. These prisms are fixed within the frame 43 which is pivotally mounted to the brackets 44 by means of shaft 45 passing through the lugs 46. The shaft 45 journaled within the brackets 44 is manipulated by the knobs 46 for bringing the prisms in or out of line with the images projected by the projector through opening 15. A linking connection 47 is connected to the crank 48 mounted on the shaft 45 and to the crank 49 fixed to the shaft 40 so that when the knobs 46 are revolved in one direction not only are the prisms 42 raised out of the line of projection but the prisms 37 are also raised out of the line of vision. In other words, prisms 37 and 42 may be shifted out of operative position simultaneously by the knobs 46.

The member 47 is formed in two sections and hooks 50 and 51 are formed at the ends of the respective sections. When the end 51 of the section connected to shaft 45 is shifted towards the right, the hook 51 will bear against the stop 53 forcing the end 54 of the other section of member 47 to the right raising the prisms 37. In the event that it is desired to raise the prisms 37 and not prisms 42, the stop 53 will leave the hook 52, not in any way affecting the arm 48 or the prisms 42 when the knob 41 is revolved to raise the prisms 37. A dividing wall 55 extending through the center of the housing longitudinally thereof between the openings 19 divides or separates the vision of the two eyes looking through lens units 16 and 18 and the openings 19.

A set of reflectors 56 and 57 are mounted on the uprights 22 and 23, the reflectors preferably being adjustable horizontally as well as vertically receiving the light rays and pictures from the projector lens 14 through the opening 15 and reflecting the same to the screens 59 on the rear wall 60 of the housing on either side of the dividing wall 55. The U-shaped brackets 61 for the reflectors 56 and 57 are pivotally mounted on shafts 62 journaled in the uprights 22 and 23. These shafts are controlled by the worm gear 63 and worm wheel 64, shaft 65 and knob 66, the manipulation of knob 66 controlling the vertical position of the pictures on the rear screen 59. The reflectors 56 and 57 are pivotally mounted at 67 to the U-shaped brackets 61 and are adjustable in a horizontal plane to shift or adjust the horizontal position of the pictures, the adjustment being controlled by the rods 68 fitting into ball and socket joints 69 and pivotally connected at their opposite ends with a roller spindle 70, working in the slot 71 of the frame 72, said frame bridging between the upright supports 22 and 23. A spring 73 secured to the pin 70 at its one end and to the lug 74 of the wall 20 at its opposite end, holds the pin 70 against the cam 75. The cam 75 is fixedly mounted to the rod 76 which is controlled by the knob 77 with the result that revolving of the knob 77 results in revolving of cam 75, shifting of pin 70 and horizontal adjustment of reflectors 56 and 57. A dial face 78 revolves with the rod indicating the relative horizontal positions of the pictures reflected by the mirrors on screens 59 with respect to the dividing wall 55 and the normal line of vision.

As shown most clearly in Fig. 12 the dividing wall or partition 55 does not extend to the top of the housing but terminates about midway between the top and bottom. The partition need only be high enough to separate or divide the lines of vision coming through the two lenses 16 and 18 to the screens 59 on which the pictures are projected. The prisms 42 are located above the partition 55 and adjacent the opening 15, and as previously described are supported in such a manner that they can be shifted into or out of the line of projection of the pictures coming from projector 12 through the opening 15.

Referring to Fig. 23, it will be noted that the frame 43 of the prisms 42 is formed with an opening 80 which registers with opening 15 in the housing and projector lens 14 and that the apices 81 of the prisms meet at approximately the center of the opening 80. When the prisms 42 are in operative position in the line of projection, as shown in the diagrams in Figs. 7 and 8, they cause a complete picture to be focused upon each of the reflectors 56 and 57 which in turn reflect or project a complete picture on each side of the dividing wall on the screens 59 formed on the inner surface of the wall 60 of the housing. The pictures thus projected on the screens 59 may be adjusted horizontally towards and away from each other by means of handles 77 or may be adjusted vertically by means of the handles 66. When the prisms 42 are shifted by means of the handles 46 so as to be out of line of projection, each of the reflectors 56 and 57 will then receive half of the picture being projected by the projector and will each reflect half of the picture on its cooperating screen 59, as brought out in the diagrams in Figs. 4 and 5. In this way half of the picture will be shown on one of the screens 59 and the other half will be shown on the other screen 59. By means of this arrangement numerous different effects may be produced. Thus, if desired, a stereoscopic film having a double row of pictures may be used in the projector. The prisms 42 and 37 will then be shifted out of the line of projection and line of vision with the result that one of the stereoscopic pictures will be projected on one of the screens 59 and the other stereoscopic picture will be projected on the other screen 59. The position of the pictures on the screens can then be adjusted vertically and horizontally by means of the handles 66 and 77 so as to produce the well known three dimensional stereoscopic effect to a person looking through the lenses 16 and 18. Also, if desired, the usual type of moving picture film may be used in the projector. Then if the prisms are shifted into the line of projection and the line of vision, duplicate pictures will be projected, one on each of the screens 59. If the prisms are shifted to inoperative position then half of the picture will be shown on one of the screens and the other half on the other screen.

To assist the operator in aligning the pictures in the proper manner on the screens 59, I preferably provide a flood gate for the projector of the type shown at 83 in Fig. 10, having cross lines or cross hairs 82 extending horizontally and vertically across the gate. When the prisms are in inoperative position, as indicated in the diagrams in Figs. 4 and 5, the cross lines will be projected on the duplicate screens 59, as indicated at 84 in Fig. 6. When the prisms are shifted to operative position, however, complete cross lines, as indicated at 84 in Fig. 9, will be projected on screens 59. When it is desired to have the projected pictures confined to the portion of the screens 59 immediately adjacent to the central partition 55, a slide 85 having a small opening 86 therein, as shown in Fig. 11, may be placed over the flood gate in such a manner that the cross hairs 82 are in alignment with the opening 86. The projected picture can then be confined to a limited area immediately adjacent the dividing wall or partition 55.

In treating, testing or exercising the eyes, the lens units 16 and 18 are adjusted so that the lens openings 31' are the proper distance apart for the patient's eyes and the lens discs 33 are rotated so as to bring the proper quality lenses 33' into registry with the openings 31'. The patient can then look through the openings 31', lenses 33' and the openings 19 into the inside of the housing and thus see the two screens 59 formed at the opposite end of the housing on the two sides of the partition or dividing wall 55. The doctor or operator adjusts the reflectors 56 and 57 to the desired position for the particular treatment, test or exercise and then operates the device in any of the previously described manners. That is, he can operate it with the prisms 37 and 42 in the line of projection and line of vision or outside of the line of projection or line of vision. When the prisms are not in operating position, as previously described, either stereoscopic or ordinary type of pictures may be projected.

The instrument will prove of great value to eye specialists in measuring phorias and determining the dominating visual nerve track. It will also prove of value in increasing fusional faculties through stimulation of binocular perception and in eliminating and correcting amblyopia and the like, increasing internal and external duction endurance and in increasing depth perception.

In addition to using the ordinary black and white type of films colored films may also be used so as to test and exercise the color perception faculties. Many other uses and applications of my invention for treating, testing and exercising the eyes will be apparent to those skilled in the art.

It will be seen that my device is extremely flexible due to the fact that the position of the projected pictures may be adjusted vertically and also horizontally towards and away from each other. It will also be seen that the line of vision to the two screens is divided by the partition 55 and that the device is so arranged that duplicate pictures may be projected on the screens or half of a picture can be projected on each of the screens or stereoscopic pictures can be projected on the screens.

It will be seen also that my invention provides a novel method of producing prismatic effects by changing the angles of the mirrors and that also an adjustable dial indicates the effect of prismatic power caused by the separation of the pictures upon the screen.

It should be understood, of course, that modifications may be made in the illustrated and described embodiment of my invention without departing from the invention as set forth in the accompanying claims.

I claim:

1. An eye testing and treating device comprising a housing having a projector opening formed in one side thereof and eye openings in the opposite side thereof, a moving picture projector mounted adjacent and outside of the housing and positioned to project an image through the projector opening into the housing, a pair of image receiving screens mounted inside the housing on the side thereof formed with the projector opening and facing the eye openings so as to be visible therethrough, a pair of reflectors one for each of the screens and having an adjustable mounting inside the housing in spaced relation from the projector opening and each positioned so as to receive at least a portion of the image projected by the projector and reflect it on its screen, said adjustable mounting being cooperable to permit of shifting of the reflected images on the screens in both horizontal and vertical directions, a pair of prisms supported end to end in an opaque frame with the apices of the prisms in confronting relation, the frame being provided with a central aperture exposing the prisms adjacent the confronting apices and the said prisms and frame having a mounting inside the housing between the projector opening and the two reflectors with the said opening in the frame and the exposed portions of the prisms disposed in the line of projection, said mounting providing for shifting of the prisms from inoperative position outside the line of projection of the projector to operative position in the line of projection so as to cause the entire image to be projected on each reflector, means extending in a plane between the two screens and eye openings for separating the lines of vision between each eye opening and screen, and a pair of prisms having a mounting inside the housing between the eye openings and screens, said mountings providing for shifting the prisms into and out of the lines of vision from eye openings to screens.

2. An eye testing and treating device comprising a housing having a projector opening formed in one side thereof and eye openings in the opposite side thereof, a moving picture projector mounted adjacent and outside of the housing and positioned to project an image through the projector opening into the housing, a pair of image receiving screens mounted inside the housing on the side thereof formed with the projector opening and facing the eye openings so as to be visible therethrough, a pair of reflectors one for each of the screens and having an adjustable mounting inside the housing in spaced relation from the projector opening and each positioned so as to receive at least a portion of the image projected by the projector and reflect it on its screen, said adjustable mounting being cooperable to permit of shifting of the reflected images on the screens in both horizontal and vertical directions, a pair of prisms supported end to end in an opaque frame with the apices of the prisms in confronting relation, the frame being provided with a central aperture exposing the prisms adjacent the confronting apices and the said prisms and frame having a mounting inside the housing between the projector opening and the two reflectors with the said opening in the frame and the exposed portions of the prisms disposed in the line of projection, said mounting providing for shifting of the prisms from inoperative position outside the line of projection of the projector to operative position in the line of projection so as to cause the entire image to be projected on each reflector, means extending in a plane between the two screens and eye openings for separating the lines of vision between each eye opening and screen, and a pair of eye pieces one for each of the eye openings mounted adjacent the eye openings so as to be adjustable laterally towards and away from each other and each having a plurality of lenses of different qualities associated therewith so that they may be selectively shifted one at a time into registry with the eye openings.

HARVEY C. RONES.